May 29, 1945.    J. J. LAVIN    2,376,925
AUTOMATIC OVERLOAD AND POWER RELEASING DEVICE
Filed April 2, 1943    3 Sheets-Sheet 1
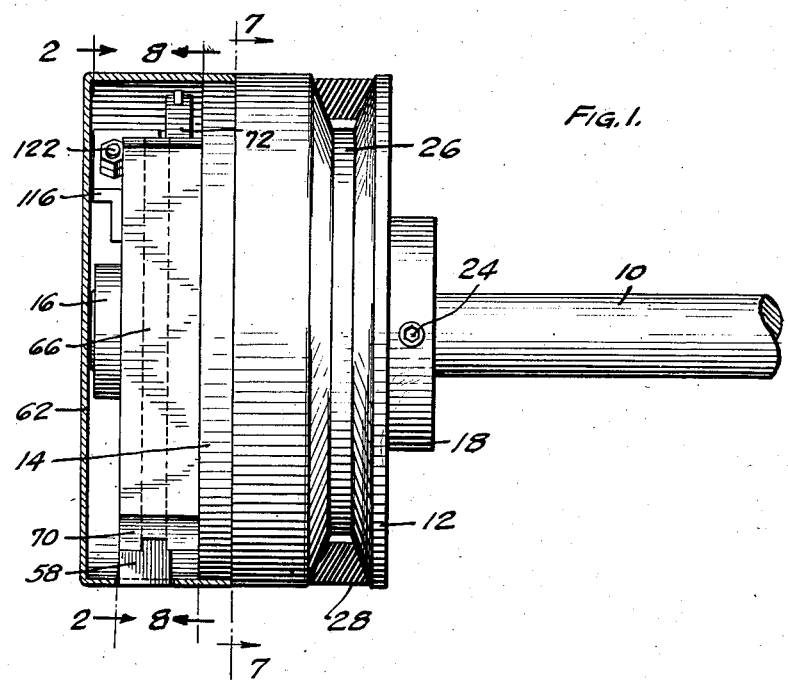
Fig. 1.
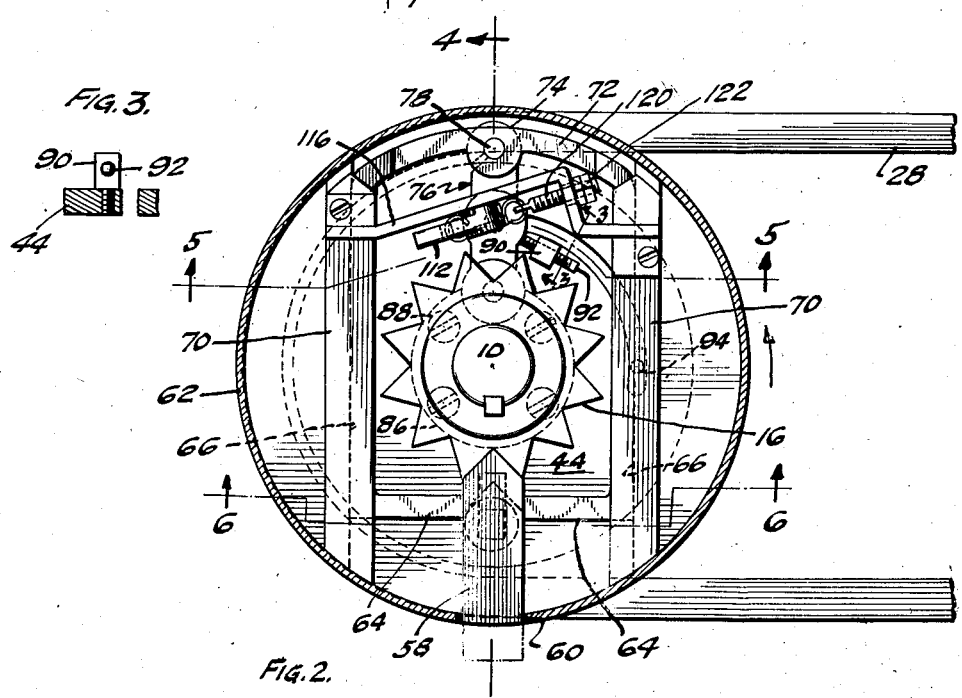
Fig. 2.
Fig. 3.
INVENTOR.
JOHN J. LAVIN
BY
*Robert Schninger*
ATTORNEY.

May 29, 1945. J. J. LAVIN 2,376,925
AUTOMATIC OVERLOAD AND POWER RELEASING DEVICE
Filed April 2, 1943 3 Sheets-Sheet 2
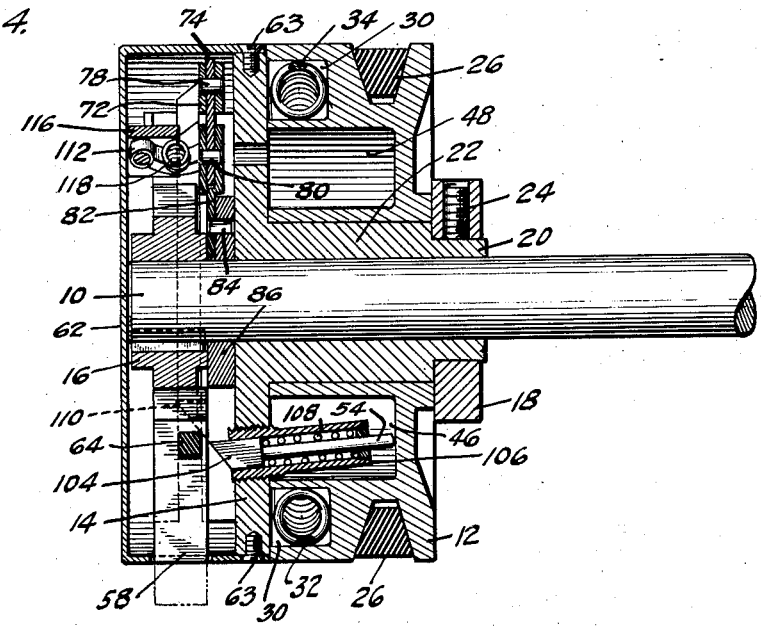
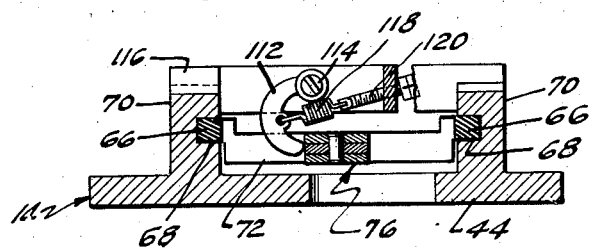
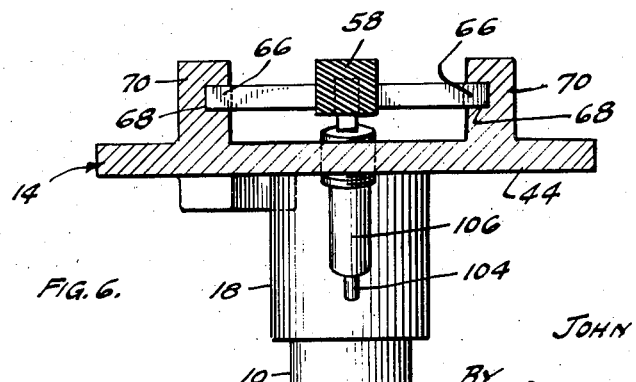
INVENTOR.
JOHN J. LAVIN May 29, 1945.    J. J. LAVIN    2,376,925
AUTOMATIC OVERLOAD AND POWER RELEASING DEVICE
Filed April 2, 1943    3 Sheets-Sheet 3

INVENTOR.
JOHN J. LAVIN
BY
Robert Danniger
ATTORNEY.

Patented May 29, 1945

2,376,925

UNITED STATES PATENT OFFICE 2,376,925

AUTOMATIC OVERLOAD AND POWER RELEASING DEVICE

John J. Lavin, Chicago, Ill.

Application April 2, 1943, Serial No. 481,657

8 Claims. (Cl. 192—56)

My invention relates to an improvement in safety devices and consists of an automatic overload and power releasing device.

The purpose of my invention is to provide a safety device to protect power driven machines against damage resulting from overloads. When a machine is subjected to a predetermined overload, my device mechanically disengages the driven unit from the driving unit, and thus the overload on the driven shaft is released.

If the operated machine is one in which it is also desirable to shut off the motor, my invention may be provided with a motor cut-off which automatically shuts off the motor immediately after the units are disengaged. In this way the device performs double safety functions. By its mechanical power release it disengages the driving unit from the driven unit, and by its motor cut-off feature it cuts off the power.

My device is provided with a spring load-carrying construction, whereby the driving power is conveyed to the machine by springs instead of by rigid parts. I have termed this a "shock absorbing feature" because by it the extra loads, that are always present when a machine is started, can be carried without the danger of having the extra starting loads release the clutch.

At the present time, many machines are provided with safety devices in which an excessive overload shears a pin. The motor usually continues to run which wastes power and might damage the motor. My device eliminates the shear pin assembly.

When the machine is repaired or freed of obstructions, my device is reset by applying normal pressure to a protruding trigger.

The principal object of the present invention is to provide an improved automatic overload and power releasing device of the type described that is spring loaded and adapted to carry sudden overloads or other ordinary variations in load which may occur, but which when a positive overload occurs, will disengage the driving shaft from a pulley through which the power is being transmitted.

A further object of the invention is to provide an improved construction of the type described wherein a ratchet and pawl are utilized to transmit the driving power from the shaft to the pulley, said pawl having a mechanism associated therewith which is directly moved by the driven pulley when an overload occurs to disengage the driven pulley against spring pressure.

A further object of the invention is to provide in a construction of the type described means whereby the pawl which releases the driven pulley may also protrude and activate a switch which may control the stopping and starting of a motor.

Other objects and advantages will be more apparent from the following description wherein reference is had to the accompanying three sheets of drawings, upon which Fig. 1 is a side elevational view of my improved device showing the driven shaft extending therefrom;

Fig. 2 is a sectional view inside of the mechanism cover taken generally on the line 2—2 of Fig. 1;

Fig. 3 is a fragmentary sectional view of a stop member which I employ and is taken on the line 3—3 of Fig. 2;

Fig. 4 is a vertical sectional view through the entire mechanism taken generally on the line 4—4 of Fig. 2;

Fig. 5 is a fragmentary sectional view showing the toggle link and associated mechanism, taken generally on the line 5—5 of Fig. 2;

Fig. 6 is a similar sectional view of the pawl and associated mechanism taken generally on the line 6—6 of Fig. 2;

Figure 7:
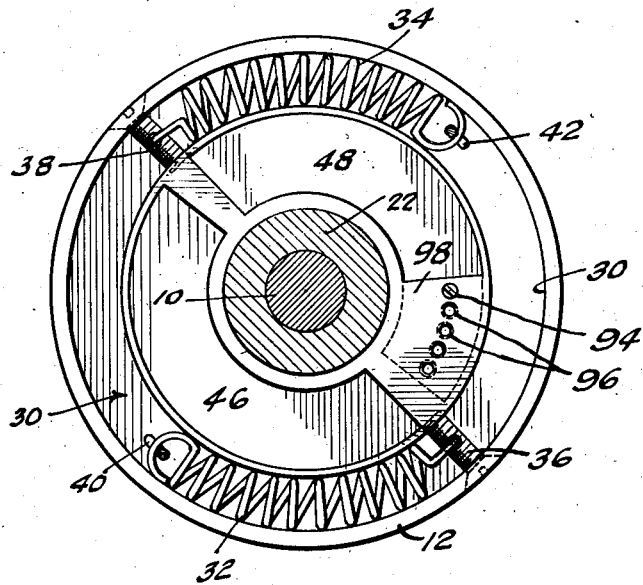
Fig. 7 is a cross-sectional view showing the special spring loaded pulley and associated parts and is taken on the line 7—7 of Fig. 1.
Figure 8:
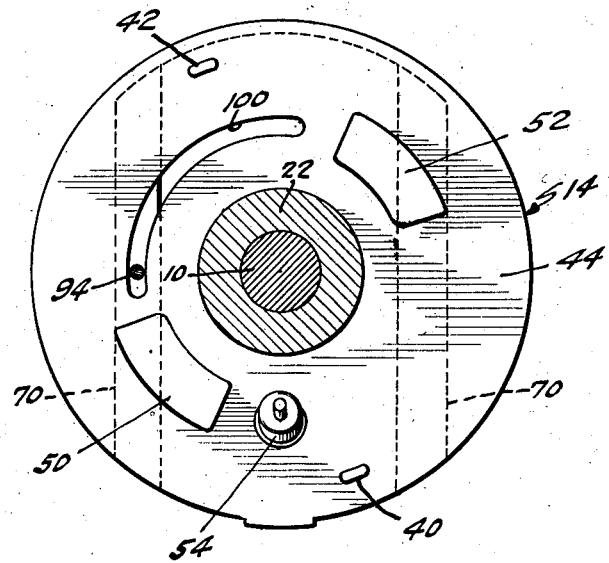
Fig. 8 is a similar sectional view taken on the line 8—8 of Fig. 1 but looking in the opposite direction from Fig. 7 showing the pawl and ratchet support member and associated parts.

In the embodiment of the invention which I have chosen to illustrate, in Fig. 1 I have shown a driven shaft 10, which may have the pulley 12 and pawl and ratchet frame mechanism 14 connected to the end of the same. The ratchet wheel 16, which is keyed to the end of the shaft, constitutes one end of the assembly with the collar 18 positioning the pulley upon a reduced shoulder 20 of the hub 22 of the member 14. The collar is held in position by suitable Allen head screw member 24.

As most clearly shown in Figs. 1, 2 and 4 of the drawings, the pulley 12 may be provided with a groove 26 to receive a V-belt 28, which V-belt may transmit the drive to its destination from the driven shaft 10. The pulley 12 may also be formed with a cylindrical cavity 30 within which a pair of coiled spring members 32 and 34 are positioned. One end of each of the springs 32 and 34 may be fastened to bolt members 36 and 38 respectively, and the other end of the spring members may be received within the hook members 40 and 42 which extend downwardly into the groove 30 from the back plate 44 of the member 14. The pulley 12 is also formed with a pair of arcuately shaped grooves 46 and 48 within which the stop members 50 and 52 on the back 44 of the member 14 are received. The pawl push-out and stop assembly 54 also extends into the cavity 46.

Referring now to Fig. 2, I have shown the star or ratchet wheel 16 keyed to the end of driven shaft 10 and engaged by a pawl member 58 which is aligned with an opening 60 in the housing 62 that covers the pawl and ratchet mechanism and is secured to the back wall 44 by the screw members 63. The pawl 58 may have outwardly extending arm portions 64 which connect with parallel arm members 66. The arm members 66 (see Figs. 5 and 6), are positioned in parallel grooves 68 in a pair of upstanding ridges 70 upon the member 14. They may be connected at their extended ends by an arcuately shaped portion 72 which is provided with a slot to receive a link 74 of a toggle member 76. The end of the link may be pivoted on the pin 78. The opposite end of link 74 is connected by a pin 80 to a similar link member 82 that is pivoted upon pin 84 on a ring member 86 which is secured by screw members 88 to the wall 44. A stop member 90 provided with an adjustable screw 92 (see Fig. 3), is mounted on the wall 44 to effect a limit stop for the toggle mechanism shown.

With the link mechanism aligned as shown in Fig. 2, the pawl 58 normally engages one of the teeth of the ratchet member 16 and in this position effectively locks the entire assembly to the driven shaft 10. When there is an overload on the pulley 12, the pin 94, which is mounted in one of the row of tapped holes 96 in a vertical wall 98 of the pulley 12 will be moved against the direction of rotation of the shaft 10, and passing through the arcuate slot 100 in the back wall 44 will eventually reach toggle link 76 and press against the same at its center pivot 80, thereby rotating the same counter-clockwise and permitting the pawl 58 to be retracted from the position shown in Fig. 2 so that the ratchet will be released from the pawl and the driving connection between the pulley 12 and the shaft 10 will be broken. At the same time the pawl 58 is moved outwardly it may press against a switch (not shown) and shut off a motor or other mechanism which is controlled by such switch.

Means for assisting guiding and stopping the movement of pawl 58 may include trigger member 104 which is mounted in a cylindrical housing 106 in the back wall 44. The trigger member 104 is normally pressed outwardly by a compression spring 108 and enters the slot 110 in the pawl 58 thereby both assisting in its movement outwardly and in providing an effective stop at its outward limit.

I provide means for normally holding the toggle mechanism in the operative position shown in Fig. 2. This means may include a spring loaded lever 112 which is pivotally mounted upon a bolt member 114 that enters a cross-bar 116, which is positioned between the ridges 70 of the member 14. The lever 112 may have a coiled spring member 118 connected between the same and a bolt member 120 which extends through an opening in one of the legs of the cross-member 116. Nut members 122 are provided on the bolt member 120 to secure the desired tension on the spring 118.

With the construction which I have described it can be seen that I have provided a very effective and efficient overload and power releasing device whereby I utilize a pair of coiled springs to permit of slight variation in load, yet which, when an overload is reached, will positively unlock and disengage the driving pulley from the driven shaft.

At the same time, the pawl member which is actuated to effect the release of the driving pulley is also moved outwardly in a positive manner so that a switch or other mechanism can be shut off by engagement with the same.

The mechanism can of course be reset by pressing in the pawl 58 so that all the mechanism is reset to the position shown in Fig. 2. By means of the series of tapped opening 96, the amount of spring tension which is desired before release can be varied to suit the individual requirements.

While I have shown and described a specific embodiment of the invention, it will be apparent to those skilled in the art that changes and modifications may be made in the exact details shown. I do not wish to limit myself in any particular, rather what I desire to secure and protect by Letters Patent of the United States is:

1. Apparatus of the class described including a driven shaft, a ratchet wheel secured thereto, a pulley rotatably mounted on said shaft, a pawl member associated with said pulley and adapted to engage said ratchet wheel, said pawl member having sideward extensions, guide members associated with said pulley having parallel grooves therein, said extensions entering said grooves, an arm connecting said extensions at one end thereof, a toggle mechanism associated therewith and means on said pulley for moving said toggle mechanism to release said pawl from engagement with said ratchet wheel.

2. Apparatus of the class described including a driven shaft, a ratchet wheel secured thereto, a pulley rotatably mounted on said shaft, a pawl member associated with said pulley and adapted to engage said ratchet wheel, said pawl member having sideward extensions, guide members associated with said pulley having parallel grooves therein, said extensions entering said grooves, an arm connecting said extensions at one end thereof, a toggle mechanism associated therewith and means on said pulley for moving said toggle mechanism to release said pawl from engagement with said ratchet wheel, said means including a pin member adapted to engage said toggle mechanism to disengage said pawl member from said ratchet wheel.

3. Apparatus of the class described including a driven shaft, a ratchet wheel secured thereto, a pulley rotatably mounted on said shaft, a pawl member associated with said pulley and adapted to engage said ratchet wheel, said pawl member having sideward extensions, guide members associated with said pulley having parallel grooves therein, said extensions entering said grooves and slidable therein, an arm connecting said extensions at one end thereof, a toggle mechanism associated therewith and means on said pulley for moving said toggle mechanism to release said pawl from engagement with said ratchet wheel, and a stop member engaging said pawl to effect a predetermined movement of the same.

4. Apparatus of the class described including a driven shaft, a ratchet wheel secured thereto, a pulley rotatably mounted on said shaft, a generally rectangular frame member associated with said pulley, a pawl member mounted on said frame member and adapted to engage said ratchet wheel, said frame member having sideward extensions, guide members associated with said pulley having parallel grooves therein, said extensions entering said grooves and slidable therein, an arm connecting said extensions at one end thereof, a toggle mechanism associated therewith and means on said pulley for moving said toggle mechanism to release said pawl from engagement with said ratchet wheel.

5. An automatic overload and power releasing device including a driven shaft, a ratchet keyed to the end of said shaft, said ratchet engaging a pawl, a generally rectangularly shaped frame carrying said pawl, a pair of guides, a pair of the parallel sides of said frame slidably mounted in said guides, a housing for supporting said guides and enclosing said mechanism, said housing having a collar surrounding said shaft, a pulley rotatably mounted upon said collar, means including said pawl connecting said pulley and said ratchet whereby rotation of said shaft is secured from said pulley through said ratchet.

6. An automatic overload and power releasing device including a driven shaft, a ratchet keyed to the end of said shaft, said ratchet engaging a pawl, a generally rectangularly shaped frame carrying said pawl, a pair of guides, a pair of the parallel sides of said frame slidably mounted in said guides, a housing for supporting said guides and enclosing said mechanism, said housing having a collar surrounding said shaft, a pulley rotatably mounted upon said collar, means including said pawl connecting said pulley and said ratchet whereby rotation of said shaft is secured from said pulley through said ratchet and spring means connected between said pulley and said pawl for permitting a degree of overload.

7. An automatic overload and power releasing device including a driven shaft, a ratchet keyed to the end of said shaft, said ratchet engaging a pawl, a generally rectangularly shaped frame carrying said pawl, a pair of guides, a pair of the parallel sides of said frame slidably mounted in said guides, a housing for supporting said guides and enclosing said mechanism, said housing having a collar surrounding said shaft, a pulley rotatably mounted upon said collar, means including said pawl connecting said pulley and said ratchet whereby rotation of said shaft is secured from said pulley through said ratchet, said pawl adapted when disengaged from said ratchet to move only a predetermined distance.

8. Apparatus of the class described including a driven shaft, a ratchet wheel secured thereto, a pulley rotatably mounted on said shaft, a pawl member associated with said pulley and adapted to engage said ratchet wheel, said pawl member having sideward extensions, guide members associated with said pulley having parallel grooves therein, said extensions entering said grooves and slidable therein, an arm connecting said extensions at one end thereof, a toggle mechanism associated therewith and means on said pulley for moving said toggle mechanism to release said pawl from engagement with said ratchet wheel, and a spring pressed stop member engaging said pawl to effect a predetermined movement of the same.

JOHN J. LAVIN.